Aug. 24, 1954     A. H. VALENTINE     2,687,000
MOWER ATTACHMENT
Filed Feb. 25, 1952

INVENTOR.
Arthur H. Valentine
BY
Wilson and Wildowson
ATTORNEYS

Patented Aug. 24, 1954

2,687,000

UNITED STATES PATENT OFFICE 2,687,000

MOWER ATTACHMENT

Arthur H. Valentine, Douglass, Kans.

Application February 25, 1952, Serial No. 273,189

7 Claims. (Cl. 56—299)

This invention relates to an attachment for a mower whereby plugging and clogging of the assembly aperture in the outer shoe of the mower cutter bar is prevented. In one embodiment, a cleaning member, comprising a cutting element and a cleaning element, is mounted on the sickle bar of the mower such that accumulated material is removed from the assembly aperture in the outer shoe of the mower as the sickle bar reciprocates therethrough, thereby preventing plugging and clogging of the assembly aperture. In another embodiment, a cleaning member comprising an arcuate segment of substantially the same shape as the assembly aperture in the outer shoe of the mower is mounted on the sickle bar such that accumulated material is removed from the assembly aperture as the sickle bar reciprocates therethrough.

In present mowers, material tends to accumulate in the assembly aperture in the outer shoe of the mower cutter bar during cutting operations, thereby plugging and clogging the aperture. Such plugging and clogging results in much loss of time, inefficient cutting, breaking of mower parts, and the like, and is therefore a serious and vexing problem. Much time and effort has been expended in an attempt to solve this problem, but thus far no satisfactory solution has been obtained. For example, a detachable plate adapted to cover the aperture and thereby prevent material from entering the aperture is disclosed in United States Patent No. 2,051,394. Such devices have been found unsatisfactory in that although only a slight clearance has been provided between the plate and the sickle bar, material works itself into this small space and plugs same, thereby necessitating frequent stops for cleaning and often causing failure of various mower parts.

By the practice of my invention wherein cleaning means is mounted on the sickle bar such that the cleaning means passes through the assembly aperture in the shoe during the reciprocatory movement of the sickle and removes accumulated material from the aperture, difficulties encountered in present mowers due to plugging and clogging of the assembly aperture are avoided. My invention makes possible the saving of much time in that stops for purposes of removing accumulated material from the aperture are eliminated. Also the time presently consumed in repairing parts broken as a result of the plugging and clogging of the aperture is saved. Further, a great saving in cost of operation is realized by the practice of my invention in that breakage due to plugging and clogging of the assembly aperture is eliminated.

An object of the invention is to provide a means for preventing plugging and clogging of the assembly aperture in the outer shoe of a mower cutter bar.

Another object is to provide an attachment for mowers which makes possible the saving of much time and expense in mowing operations.

Another object is to provide a removably mounted attachment for mowers which prevents plugging and clogging of the assembly aperture in the outer shoe of the mower cutter bar.

Another object is to provide a cleaning attachment for a mower which can be removably mounted on the sickle bar of the mower when the sickle bar is in position on the mower cutter bar.

Still another object of my invention is to provide an attachment for preventing plugging and clogging of the assembly aperture in the outer shoe of the mower cutter bar, the attachment comprising both a cutting means and a cleaning means.

Other objects and advantages will be apparent upon reading the accompanying discussion and disclosure.

My invention can be more clearly understood by reference to the accompanying drawing wherein.

Figure 1:
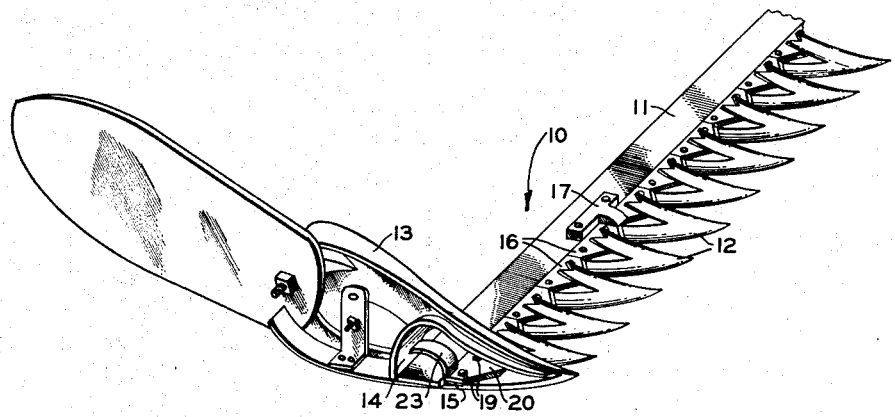
Fig. 1 is a perspective view of a portion of a mower cutter bar showing one embodiment of the attachment of my invention mounted in operative position on the mower sickle bar.
Figure 3:
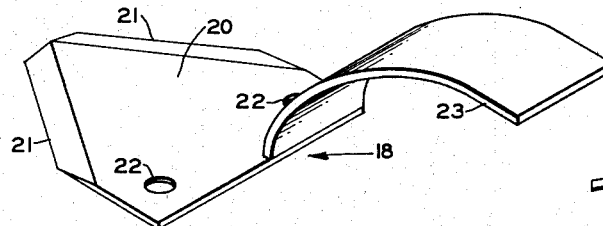
Fig. 3 is an enlarged perspective view of the attachment of my invention shown in Figs. 1 and 2.
Figure 2:
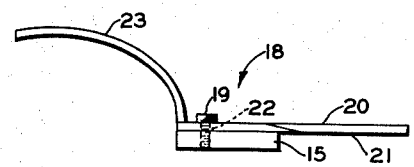
Fig. 2 is an enlarged end view of a sickle bar with the attachment shown in Fig. 1 mounted thereon.

Referring now to Figs. 1, 2, and 3, a mower cutter bar, indicated generally at 10, is comprised of a beam 11, a plurality of finger guards 12 spaced longitudinally along beam 11, an outer shoe 13 mounted on the end of beam 11, shoe 13 having an assembly aperture 14 formed therein, and a sickle bar 15 mounted on beam 11 for reciprocal longitudinal movement thereon, the end portion of sickle bar 15 being adapted to be alternately extended and withdrawn through aperture 14 in shoe 13 during its reciprocatory movement. A plurality of knife sections 16 are longitudinally spaced along sickle bar 15 and provide the primary cutting means for the mower, sickle bar 15 being held in position on beam 11 by hold-down plate 17. Cleaning member 18 is removably mounted on the end of sickle bar 15 by cap screws 19 such that member 18 passes through aperture 14 in shoe 13 during the reciprocatory movement of sickle bar 15.

Cleaning member 18 is comprised of a cutting element 20, cutting element 20 having knife means 21 at one end thereof and mounting means 22 at the other end thereof, and a cleaning element 23, cleaning element 23 being formed by an arcuate segment projecting upwardly from cutting element 20. The arcuate segment forming cleaning element 23 may vary widely in size and shape, the principal requirement being that it pass freely through aperture 14 in shoe 13 during the reciprocatory movement of sickle bar 15 and remove accumulated material from the aperture. The determination of the size and shape of cleaning element 23 for each particular application is within the skill of the art and depends primarily upon the size and shape of aperture 14.

Cleaning element 23 is preferably formed as an integral extension of cutting element 20; however it can be mounted as a separate unit on cutting element 20 by welding, riveting, or other suitable means.

Figure 4:
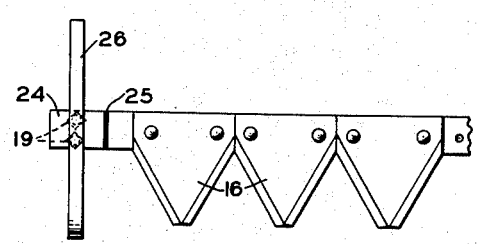
Fig. 4 is a top view of a portion of a sickle bar having another modification of the attachment of my invention mounted thereon.
Figure 5:
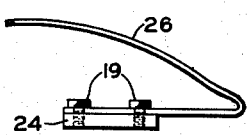
Fig. 5 is an end view of the sickle bar and attachment of Fig. 4.
Figure 6:
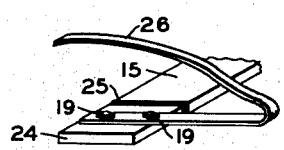
Fig. 6 is a perspective view of the sickle bar and attachment of Figs. 4 and 5.

Referring now to Figs. 4, 5, and 6, wherein another modification of my invention is illustrated, 15 and 16 indicate a sickle bar and knife sections, respectively, similarly as in Figs. 1, 2, and 3. An extension 24 of sickle bar 15 is secured to the sickle bar at 25 by welding or other suitable means. Cleaning arm 26, formed by an arcuate segment having substantially the same size and shape as assembly aperture 14 in shoe 13, is removably mounted on extension 24 by cap screws 19. The size and shape of the arcuate segment forming cleaning arm 26 can vary widely, the primary requirement being that it pass through aperture 14 in shoe 13 in each particular application and remove accumulated material therefrom during reciprocatory movement of sickle bar 15. I have described cleaning arm 26 as being mounted on extension 24 which has been secured by welding to the sickle bar; however, it is understood that it is within the scope of my invention to provide a sickle bar of such length that arm 26 can be mounted directly thereon without the use of extension 24. The use of the extension is desirable in the utilization of this modification of my invention on presently existing mowers wherein arm 26 would interfere with the action of sickle bar 15 if mounted directly thereon.

It will be obvious to those skilled in the art that changes in details of construction of the attachment of my invention as described herein can be made without departing from the spirit and scope thereof, and therefore the modifications described herein are to be considered as illustrating rather than limiting my invention.

I claim:

1. A cutter bar for a mower comprising, in combination, a beam, finger guards mounted along said beam, a sickle bar mounted for longitudinal reciprocatory movement on said beam, said sickle bar having cutting elements attached thereto along the length thereof adapted to pass through said finger guards, a ground-engaging, supporting shoe secured to the outer end portion of said beam, said shoe having an aperture therein, in alinement with said sickle bar and adapted to receive the outer end portion of said sickle bar during reciprocation of the same, and cleaning means mounted on the outer end portion of said sickle bar, said cleaning means extending upwardly and transversely of said sickle bar and adapted to pass freely through said aperture in said shoe during said reciprocatory movement of said sickle bar and keep said aperture free of foreign material, thereby preventing plugging and clogging of said aperture.

2. The structure according to claim 1, wherein said cleaning means comprises in combination with the cutting element on the outer end of said sickle bar, an arm member secured to the rear portion of the cutting element and projecting upwardly and rearwardly from same and adapted to pass freely through said aperture.

3. The structure according to claim 1, wherein said cleaning means comprises a cutting element having a pair of apertures in the rear portion thereof for receiving attaching means for mounting same on the outer end of said sickle bar, an arcuate member having one end thereof rigidly secured to said cutting element adjacent the rear end thereof, and said arcuate member projecting upwardly and rearwardly from the cutting element for free passage through said aperture.

4. The structure according to claim 1, wherein said cleaning means comprises an arcuate member having the same general contour as the wall of said aperture, and the lower portion of the member having holes therein and being directly secured to the sickle bar by means extended through said holes and into the bar.

5. The structure according to claim 1, wherein said cleaning means comprises a unitary member including a cutting element for attachment to the outer end of the sickle bar, and an arm member having one end thereof rigidly connected to the rear portion of the cutting element, said arm member projecting upwardly and rearwardly from said rear portion of the cutting element for free passage through said aperture.

6. The structure according to claim 1, wherein said cleaning means comprises a unitary member including a cutting element having holes in the rear portion thereof and adapted for removable mounting on the outer end of said sickle bar by threaded means extended through said holes and into the sickle bar, and an arm member of arcuate form having one end thereof rigidly secured to said cutting element adjacent the rear end thereof, said arm member projecting upwardly and rearwardly from its point of attachment to the cutting element for free passage through said aperture.

7. The structure according to claim 1, wherein said sickle bar is provided with an extension on the outer end thereof, and said cleaning means comprises an arcuate member having one end thereof secured to said extension, and the body of the member extending upwardly and rearwardly of the sickle bar.

References Cited in the file of this patent

UNITED STATES PATENTS

| Number | Name | Date |
| --- | --- | --- |
| 22,684 | Whiteley | Jan. 18, 1859 |
| 33,657 | McCormick | Nov. 5, 1861 |
| 1,252,608 | Nothaft | Jan. 8, 1918 |
| 1,272,628 | Crawford | July 16, 1918 |
| 2,051,394 | Reever | Aug. 18, 1936 |
| 2,532,174 | Lieberman | Nov. 28, 1950 |